B. GOODMAN.
LOCK FOR AUTOMOBILES.
APPLICATION FILED SEPT. 6, 1916.
1,205,988.
Patented Nov. 28, 1916.
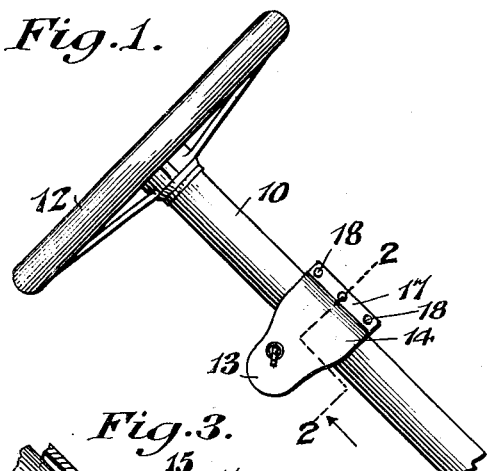
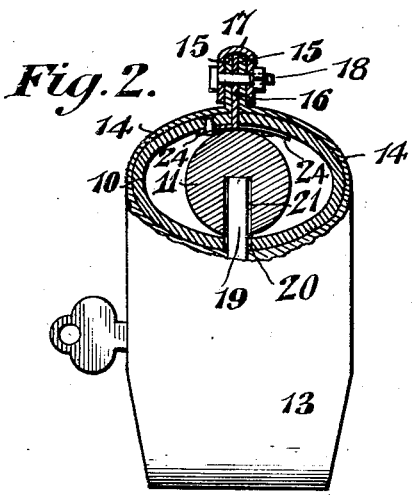
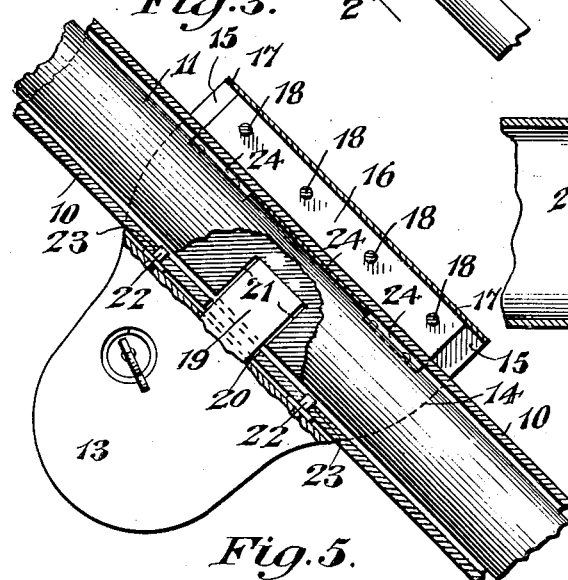
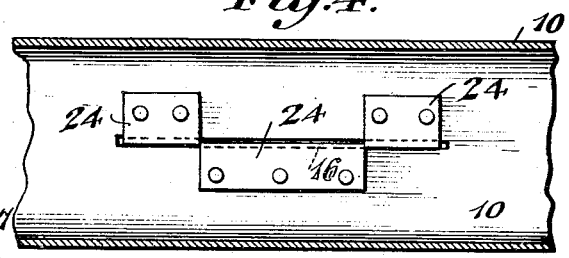
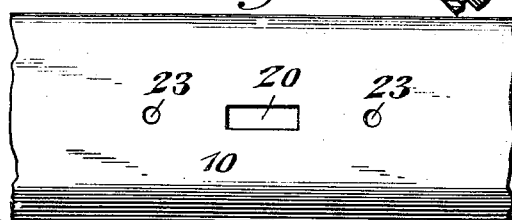
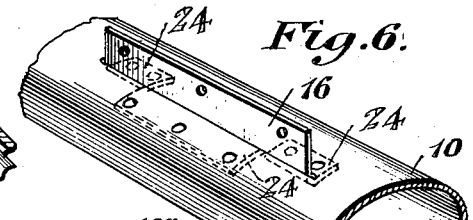
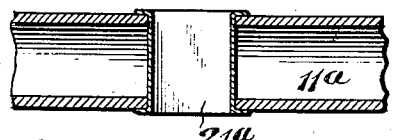
WITNESSES
Jas. F. McCathran
J. J. Mawhinney
INVENTOR
Benedict Goodman,
BY
E. G. Siggers
ATTORNEY

UNITED STATES PATENT OFFICE.

BENEDICT GOODMAN, OF HOLLY, COLORADO.

LOCK FOR AUTOMOBILES.

1,205,988.   Specification of Letters Patent.   Patented Nov. 28, 1916.

Application filed September 6, 1916. Serial No. 118,723.

*To all whom it may concern:*

Be it known that I, BENEDICT GOODMAN, a citizen of the United States, residing at Holly, in the county of Prowers and State of Colorado, have invented a new and useful Lock for Automobiles, of which the following is a specification.

The present invention has reference to automobile locks, and refers more particularly to a locking device for application to the steering shafts of motor vehicles to prevent the turning of the steering shaft.

The object of the present invention is to provide a locking attachment to be applied to the steering column of an automobile for locking the steering wheel and its parts from turning, so that the automobile cannot be controlled and thus operated by an unauthorized person.

The present invention carries out the above noted object by the provision of a casing having a lock therein, which casing is clamped about the steering tube and is peculiarly mounted thereon to hold the lock casing from turning about the tube, so that the locking device cannot be readily displaced or removed from the steering column.

The invention will be best understood from a consideration of the following detailed description, taken in connection with the accompanying drawing, forming part of this specification with the further understanding that while the drawing shows a practical form of the invention, the latter is not confined to strict conformity with the showing of the drawing, but may be changed and modified, so long as such changes and modifications come within the scope of the appended claims.

In the drawing: Figure 1 is a perspective view of the upper end of a steering colunm showing a locking device applied thereto and constructed according to the present invention. Fig. 2 is an enlarged sectional view of the same, taken on the line 2—2 of Fig. 1, the steering wheel being removed. Fig. 3 is a longitudinal central section, taken through the locking device and parts of the steering column, showing the parts locked together. Fig. 4 is an inside plan view of the rear or lower wall of the steering tube, showing the anchoring web secured thereto. Fig. 5 is a fragmentary view of the outer wall of the steering tube, showing the lock bolt and centering pin openings. Fig. 6 is a fragmentary perspective view of the steering tube, showing the anchoring web secured thereto, and showing the opposite side of the rear wall of the tube from that shown in Fig. 4. Fig. 7 is a similar view, showing a modified form of anchoring web. Fig. 8 is a fragmentary sectional view, taken longitudinally through a hollow steering post or shaft. Fig. 9 is a transverse section, taken centrally through the same.

Referring to this drawing, 10 designates a steering tube in which is mounted a steering shaft or post 11 provided upon its upper end with a steering wheel 12. A lock casing 13 has its face concaved to conform to one side of the steering tube 10, as shown in Fig. 2, and has straps 14 forming continuations of the concaved face and adapted to engage around the opposite side of the tube 10 to inclose it. The straps 14 have outturned flanges 15 on their free ends which abut against the opposite sides of an outwardly extending web 16 fixed upon the tube 10 to anchor the straps 14 and the casing 13 from turning about the tube 10.

The flanges 15 are held against the web 16 by a clip 17. The clip is substantially U-shaped in cross section, and preferably corresponds in length to the lengths of the web 16 and flanges 15, to hold the flanges throughout their lengths in contact with the web. Bolts 18, or other suitable fastening devices, are passed at spaced apart intervals through the clip 17, and the flanges and the web to secure all of said elements together.

The lock casing 13 carries any suitable locking mechanism, the locking bolt 19 of which projects from the concaved face of the casing 13, through a slot 20 in the steering tube, and into a keeper slot 21, which is formed in one side of the steering shaft 11. The bolt 19 rests in this keeper slot 21 when the shaft 11 is turned into position to register the slot 21 with the slot 20.

The lock casing 13 is provided with one or more anchoring pins 22 projecting from its concaved face, preferably above and below the lock bolt 19 and adapted to fit snugly in openings 23 formed in the wall of the steering tube 10 adjacent to the slot 20. These anchoring pins 22 are adapted to hold the casing 13 from shifting longitudinally upon the steering tube, either by the vibration of the automobile when in motion, or under the action of blows imparted by a hammer, or the like, when attempt is made to dislodge the lock casing from the steering column.

As shown in Figs. 2, 3, 4 and 6, the web 16 may be in the form of a strip of sheet metal slitted at intervals along one edge to provide a plurality of tongues 24 which are bent alternately at substantially right angles in opposite directions, and which are riveted, or otherwise permanently secured against the inner wall of the steering tube 10. The body portion of this strip projects outwardly from the forward or upper side of the tube 10 to form the web 16.

In Fig. 7, a modified form of web 16ª is shown. The web 16ª is made in a number of sections or parts, which are cut and stamped from the front side wall of the steering tube 10 and turned outwardly. Preferably, the sections of the web 16ª are cut from the wall at opposite sides of a central line and are bent upwardly to lie in substantially the same plane. In this case, the bolts 18 engage through the various sections of the web 16ª, in the same manner as is shown in Fig. 2.

In Figs. 8 and 9, there is shown a slightly different form of steering shaft or post 11ª. In this instance, the steering shaft is hollow or tubular, and is slotted at diametrically opposed points, and has a transversely extending tube 21ª flanged at its ends against the outer side of the steering shaft 11ª, and providing a keeper slot to receive the lock bolt 19 therein from either side of the steering shaft. The lock casing 13 may thus be permanently secured upon steering columns of the usual construction, and the lock casing is held from shifting either longitudinally of or about the steering column, the securing means which prevents this shifting also serving as the means for securing the lock casing to the steering column.

What is claimed is:—

1. In a locking device for steering gears, and in combination, a hollow steering tube having a slot in one side thereof, and a steering post mounted in the tube and having a keeper slot therein adapted to be brought into register with the opening in the tube, a lock casing fitting against the side of said steering tube and provided with straps adapted to inclose said tube and having outturned flanges on their free ends, a lock bolt in said casing adapted to be projected through said slots in the tube and the steering post to lock the latter from turning in the tube, a web secured to and extending along the opposite side of said tube and adapted to receive said flanges thereagainst, an elongated clip fitting over said flanges and said web, and securing means passing through said clip, said flanges and said web to secure all of said elements together and hold the lock casing from rotation about said tube.

2. In a locking device for automobiles, and in combination, a steering tube having a slot and openings adjacent to the slot in one side, a lock casing having a concaved face adapted to fit snugly against said steering tube and provided with a lock bolt adapted to be projected into said slot, anchoring pins projecting from the concaved face of the casing for engagement in said openings of the steering tube to hold the lock casing from shifting longitudinally of or about the tube, a pair of straps on said lock casing engaging about the opposite sides of the tube, a longitudinal web fixed to and outstanding from the tube, flanges on the outer ends of said straps adapted to abut against the opposite sides of the web, a clip engaging over said flanges and said web to bind them together, and securing means passing through the clip, the flanges and the web to secure said elements in assembled relation.

In testimony that I claim the foregoing as my own, I have hereto affixed my signature in the presence of two witnesses.

BENEDICT GOODMAN.

Witnesses:
 ROBERT KING,
 ED. HABERSTUCK.